(12) United States Patent
Calcagno et al.

(10) Patent No.: US 11,394,293 B2
(45) Date of Patent: Jul. 19, 2022

(54) SOFT-START CIRCUIT FOR CONVERTERS, CORRESPONDING CONVERTER DEVICE AND METHOD

(71) Applicant: STMicroelectronics S.r.l., Agrate Brianza (IT)

(72) Inventors: Giuseppe Calcagno, Messina (IT); Alberto Cattani, Cislago (IT); Giuseppina Sapone, Aci Catena (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 95 days.

(21) Appl. No.: 17/072,284

(22) Filed: Oct. 16, 2020

(65) Prior Publication Data

US 2021/0036601 A1 Feb. 4, 2021

Related U.S. Application Data

(63) Continuation of application No. 16/504,885, filed on Jul. 8, 2019, now Pat. No. 10,826,384.

(30) Foreign Application Priority Data

Jul. 18, 2018 (IT) .................. 102018000007321

(51) Int. Cl.
*H02M 1/36* (2007.01)
*H02M 3/157* (2006.01)
*H02M 3/156* (2006.01)
*H02M 1/00* (2006.01)

(52) U.S. Cl.
CPC ............. *H02M 1/36* (2013.01); *H02M 3/156* (2013.01); *H02M 3/157* (2013.01); *H02M 1/008* (2021.05); *H02M 1/0012* (2021.05); *H02M 1/0025* (2021.05)

(58) Field of Classification Search
CPC .......... H02M 1/36; H02M 1/56; H02M 1/157; H02M 1/0012; H02M 1/0025
See application file for complete search history.

(56) References Cited

U.S. PATENT DOCUMENTS

| 7,417,877 | B2* | 8/2008 | Leung | H02M 1/36 323/283 |
|---|---|---|---|---|
| 8,922,181 | B2* | 12/2014 | Yamaura | H02M 1/36 323/283 |
| 9,287,772 | B2* | 3/2016 | Hussien | H02M 3/156 |
| 9,541,974 | B1 | 1/2017 | Presti et al. | |
| 9,641,073 | B2 | 5/2017 | Mahmoudi et al. | |
| 10,635,124 | B2 | 4/2020 | Mahajan et al. | |
| 2006/0170290 | A1 | 8/2006 | Miyagoe | |
| 2007/0120540 | A1 | 5/2007 | Sase et al. | |
| 2018/0006560 | A1 | 1/2018 | Mascioli et al. | |

FOREIGN PATENT DOCUMENTS

EP 3396837 A1 10/2018

\* cited by examiner

*Primary Examiner* — Gary L Laxton
(74) *Attorney, Agent, or Firm* — Slater Matsil, LLP

(57) ABSTRACT

A circuit is operated by receiving an input reference signal at an input node, determining a scaling ratio based on the input reference signal, generating a digital input signal as a function of the determined scaling ratio, converting the digital input signal into an analog signal that is a scaled replica of the input reference signal, and providing the analog signal at an output node of the circuit and then, after a duration of time, coupling the input reference signal to the output node.

21 Claims, 4 Drawing Sheets

SOFT-START CIRCUIT FOR CONVERTERS, CORRESPONDING CONVERTER DEVICE AND METHOD

CROSS-REFERENCE TO RELATED APPLICATIONS

This application is a continuation of U.S. patent application Ser. No. 16/504,885, filed on Jul. 8, 2019, which claims priority to Italian Patent Application No. 102018000007321, filed on Jul. 18, 2018, which application is hereby incorporated herein by reference.

TECHNICAL FIELD

Embodiments of the invention relate to soft-start circuit for converters, a corresponding converter device and a method.

BACKGROUND

Converters such as DC/DC converters are a class of circuits widely used in many applications to generate the supply voltage levels required for the operation of sophisticated electronic systems, such as smart phones, laptops or other devices. For instance, DC/DC converters may be used for providing regulated power supply to AMOLED panels in battery-supplied electronic devices.

In many applications, external capacitors are coupled at the output node of converters in order to limit possible voltage drops and provide a rather stable regulated voltage at the output node of converters.

At the start-up of a converter, as a result of an input voltage being applied at the input node of the converter, the output node of the converter ramps up to the desired regulated voltage value. In case an external capacitor is coupled at the output node of the converter, while the voltage at the output node increases (rapidly), a so-called "inrush current" (i.e., a high magnitude current) may flow through the converter from the input node to the output node to charge the output capacitor.

Such inrush current may result in damages or malfunctions of the converter and/or of the electronic device supplied thereby.

Therefore, limiting the value of such inrush current at the start-up of a converter may be relevant. Circuits designed for limiting inrush currents in converters may be referred to as soft-start circuits.

Conventional soft-start circuits for converters may involve RC filters for smoothening rising edges in signals applied at the input of converters at the start-up.

However, such conventional soft-start circuits may result in rise-times that are dependent on RC variations, e.g., PVT (process, voltage, temperature) variations.

Moreover, rise-time durations cannot be matched to the converter switching frequency. Also, RC filters are often required to be oversized to match the inrush current limitation requirements for different operating conditions of the corresponding converter device.

SUMMARY

The description relates to circuits and techniques for controlling converters. One or more embodiments may be applied to circuits and techniques for soft-start of converters, e.g., involving a limitation of inrush current at start-up of converters.

One or more embodiments may be applied to the control of plural converters with inrush current control, e.g., for application in power management integrated circuits for AMOLED panels power supply.

For instance, one or more embodiments may be applied to current-controlled DC/DC converters.

One or more embodiments contribute in providing improved solutions which may overcome the shortcomings of prior approaches.

For instance, one or more embodiments may facilitate providing a limitation of inrush current at the start-up of converters with reduced silicon area occupation of the soft-start circuit.

Moreover, one or more embodiments may facilitate providing soft-start circuits for controlling plural converters.

One or more embodiments may provide configurable soft-start circuits which may facilitate improving control of the start-up time and of the inrush current magnitude in converters.

One or more embodiments may provide configurable soft-start circuits which may facilitate reducing the effects of clock mismatches on the regulated output voltage.

In one or more embodiments, a soft-start circuit may comprise a digital-to-analog converter providing an output signal resulting from conversion to analog of a digital input signal. At least one output node of the soft-start circuit may be configured to sense the output signal from the digital-to-analog converter and to provide a replica of an input reference signal. The scaling ratio of the replica to the input reference signal is a function of the value of the digital input signal.

In one or more embodiments, the digital input signal may be a variable-frequency digital signal.

In one or more embodiments, a soft-start circuit may comprise plural output nodes for providing soft-start reference signals to respective converter devices.

In one or more embodiments, different converters may be coupled to the soft-start circuit in a certain sequence.

BRIEF DESCRIPTION OF THE DRAWINGS

One or more embodiments will now be described, by way of example only, with reference to the annexed figures, wherein.

DETAILED DESCRIPTION OF ILLUSTRATIVE EMBODIMENTS

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the extent of protection or the scope of the embodiments.

Figure 1:
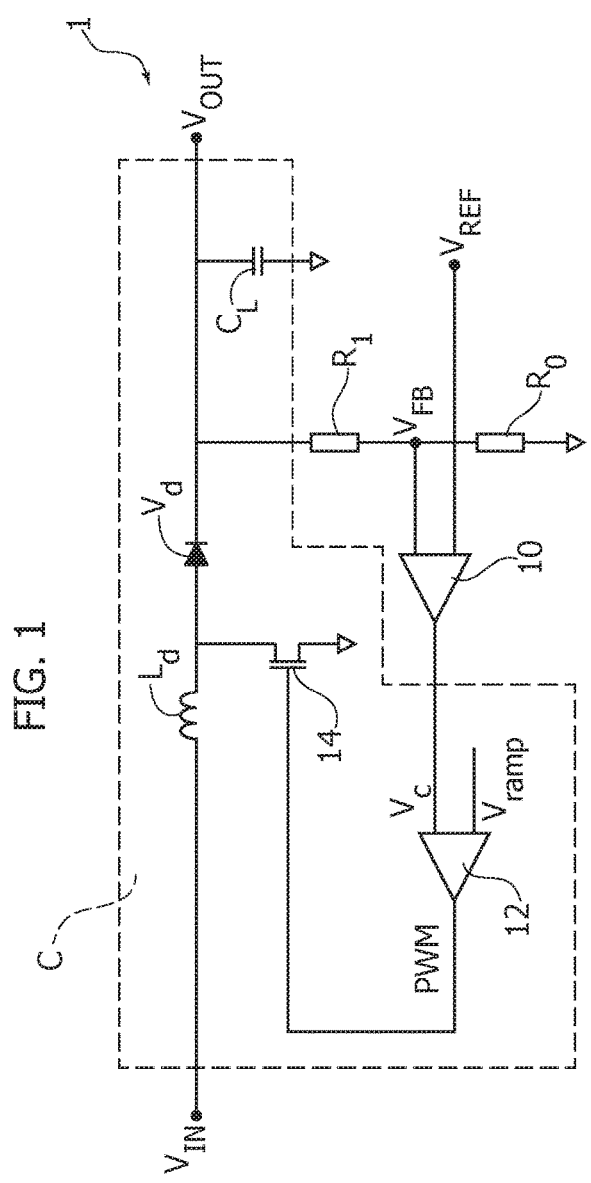
FIG. 1 is a diagram exemplary of a converter layout with a feedback loop.

By way of introduction to a detailed description of exemplary embodiments, reference may be first had to FIG. 1. FIG. 1 is exemplary of a converter C having a feedback loop. In particular, FIG. 1 is exemplary of a DC/DC converter according to a boost topology. Reference numeral 1 indicates in its entirety the converter C and the respective feedback loop.

While DC/DC converters will be referred to for simplicity throughout this description, it will be appreciated that one or more embodiments are not limited to DC/DC converters. One or more embodiments may be applied to different types of converters.

In the case of DC/DC converters, one or more embodiments may be applied to any converter topology, thus not being limited to application in boost topologies as exemplified in FIG. 1. For instance, one or more embodiments may be applied to buck, buck-boost, flyback or others topologies of DC/DC converters. Such converter topologies are well known in the art, thus a more detailed description will not be provided herein.

It is noted that, for the sake of simplicity, same designations (e.g., $V_{IN}$, $V_{OUT}$, $V_{REF}$, $V_{FB}$) will be used throughout the present description as references for nodes in circuits and for corresponding signals which may apply at such nodes.

In a conventional converter device 1 as exemplified in FIG. 1, the output (voltage) signal $V_{OUT}$ is partitioned by the voltage divider realized with the resistive elements $R_0$ and $R_1$ coupled in series between the output node $V_{OUT}$ and ground node, thus providing a feedback (voltage) signal $V_{FB}$ at a node of the voltage divider intermediate the resistive elements $R_0$ and $R_1$.

The feedback signal $V_{FB}$ may be subtracted from a reference (voltage) signal $V_{REF}$ in a differential circuit 10, e.g., a differential amplifier. A (voltage) control signal $V_C$ is therefore provided at the output of the differential circuit 10 as a function of the difference between the reference signal $V_{REF}$ and the feedback signal $V_{FB}$, and is provided at a first input node of a (voltage) comparator 12.

A second input node of the comparator 12 may receive a (periodic) ramp signal $V_{ramp}$, such ramp signal $V_{ramp}$ being generated by adding a saw-tooth signal, e.g., a saw-tooth signal with fixed amplitude and frequency, to a signal indicative of the current flowing in the power switch 14, e.g., a power MOS transistor, of the DC/DC converter 1.

Such a saw-tooth signal may be provided by a logic circuit block, not shown in the figures, and the signal indicative of the current flowing in the power switch 14 may be provided by current-sensing circuitry coupled to the power switch 14, also not shown in the figures.

Since the ramp signal $V_{ramp}$ has at least one component depending on the value of the current flowing in the power switch 14, a current-controlled feedback loop is provided in a converter device 1 as exemplified herein.

It is noted, however, that different kinds of (feedback) control signals may contribute to the ramp signal $V_{ramp}$ in alternative embodiments, thus resulting in different types of feedback loops.

By comparing the (constant) control signal $V_C$ provided at the output of the differential circuit 10 and the (periodic) ramp signal $V_{ramp}$, a pulse-width modulated signal PWM is generated at the output of the comparator 12 for controlling (e.g., switching on and off) the power switch 14 and thus controlling the value of the output voltage $V_{OUT}$ of the converter 1, the duty-cycle of such signal PWM being dependent on the value of the control signal $V_C$.

For instance, in case the power switch 14 is a MOS transistor, the output of the comparator 12 may be coupled to the gate node of the MOS transistor 14 for controlling the MOS transistor.

Operation of the feedback loop in a converter device 1 as exemplified in FIG. 1 is based on the recognition that a change of the value of the output voltage $V_{OUT}$ may result in a change of the value of the feedback signal $V_{FB}$ and thus a change of the value of the control signal $V_C$, therefore causing a change of the duty-cycle of the signal PWM that controls the power switch 14. By providing a negative feedback loop, such change of the duty-cycle of the PWM signal may act in order to restore the desired value of the output voltage $V_{OUT}$.

For instance, in the exemplified case of a boost converter, as a result of an unwanted increase of the output voltage $V_{OUT}$ being sensed, the feedback loop comprising the components $R_0$, $R_1$, 10 and 12 may act in order to decrease the duty-cycle of the signal PWM, thus having the effect of lowering the value of the output voltage $V_{OUT}$ to the desired regulated voltage value.

In a converter device 1 as exemplified in FIG. 1, a stationary working point, wherein the output voltage $V_{OUT}$ is kept fixed around a desired value, may be reached after start-up of the converter.

Depending on the operating conditions of the converter (e.g., variations of the input voltage, of the output voltage, of the output load, of the working temperature, etc.), the value of the control signal $V_C$ may vary in order to stabilize the output voltage $V_{OUT}$ around a desired value.

It is noted that, after the start-up of the converter device and before the converter reaches a stationary working point, i.e., during the so-called ramp-up phase, the capacitor $C_L$ coupled at the output node of the converter 1 is charged with a (high) current, which may be referred to as inrush current. The magnitude of the inrush current may depend on the capacitance of the output capacitor $C_L$, on the output voltage variation during the ramp-up phase, and on the duration of the ramp-up phase, according to the following equation:

$$I_{inrush} = C_L \cdot \frac{dV_{OUT}}{dt}$$

A possible method of reducing the magnitude of the inrush current at the start-up of a converter device may involve increasing the duration of the ramp-up phase. Circuits providing an increased duration of the ramp-up phase may be referred to as soft-start circuits.

For instance, an increased duration of the ramp-up phase may be obtained by providing a converter device 1 with a reference signal $V_{REF}$ which is not constant over time.

For instance, by increasing the rise time of the reference signal $V_{REF}$, a slower increase of the output voltage $V_{OUT}$ may be obtained, thus resulting in a lower magnitude of the inrush current.

Figure 2:
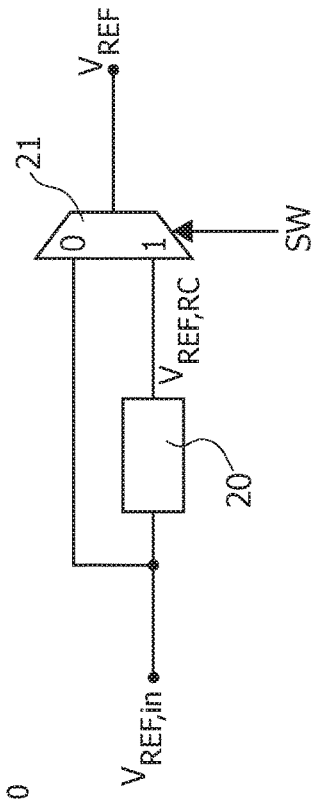
FIG. 2 is exemplary of a soft-start circuit architecture adapted for use in the layout of FIG. 1.

FIG. 2 is exemplary of a soft-start circuit architecture adapted for use in a layout as exemplified in FIG. 1, the soft-start circuit architecture involving an RC filter block 20 for providing a time-dependent reference signal $V_{REF}$.

Throughout the figures annexed herein, like parts or elements are indicated with like references/numerals and a corresponding description will not be repeated for brevity.

In a soft-start circuit as exemplified in FIG. 2, a reference signal $V_{REF}$ is provided at the output node of the circuit for coupling to the feedback loop of a converter device 1, e.g., a converter device as exemplified in FIG. 1.

Such output node of the soft-start circuit can be selectively coupled, e.g., by means of a multiplexer 21 controlled by a control signal SW, to a (constant) input reference signal $V_{REF,in}$ or to the output $V_{REF,RC}$ of an RC filter block 20 having the input coupled to the input reference signal $V_{REF,in}$.

Therefore, during the ramp-up phase of a converter device, the output node of the soft-start circuit coupled thereto may receive a signal from the output node $V_{REF,RC}$ of the RC filter block 20, which provides a signal $V_{REF,RC}$ increasing with a certain time constant as a result of the input reference signal $V_{REF,in}$ increasing with a (steep) rising edge, which is a typical behavior at start-up. Such time constant of the signal $V_{REF,RC}$ may depend on the values of the resistive and capacitive components in the RC filter block 20.

Once the signal $V_{REF,RC}$ stabilizes around the value $V_{REF,in}$, the value of the control signal SW of the multiplexer 21 may be changed, thus directly coupling the output node $V_{REF}$ of the soft-start circuit to the input reference signal $V_{REF,in}$.

Therefore, in a soft-start circuit as exemplified in FIG. 2, a RC filter block 20 is used in order to provide a time-dependent reference signal $V_{REF}$ which may result in a slower increase of the output voltage $V_{OUT}$ of a converter device coupled thereto, thus resulting in a lower magnitude of the inrush current.

However, a soft-start circuit as exemplified in FIG. 2 may have several drawbacks.

For instance, the rise time of the signal $V_{REF,RC}$, and thus the duration of the ramp-up phase of the converter device, may depend on the values of the resistive and capacitive components of the RC filter block 20. Such components may have corner variations and PVT (process, voltage and temperature) variations up to ±15% of their nominal value, thus resulting in unwanted and unpredictable variations of the duration of the ramp-up phase of the converter device.

Moreover, in a circuit as exemplified in FIG. 2, the variations of the rise time of the signal $V_{REF,RC}$, and thus the variations of the duration of the ramp-up phase of the converter device, may not depend on the variations of the frequency of the clock signal that is used for generating the ramp signal $V_{ramp}$, e.g., for generating the above-mentioned (periodical) saw-tooth signal (such frequency being also referred to as the "converter switching frequency" in the present description, since it is related to the switching frequency of the power switch 14 in the converter device).

Therefore, the duration of the ramp-up phase of the converter device may not be correlated to the converter switching frequency, i.e., the frequency of the PWM modulated signal provided at the output of the comparator 12 for controlling the power switch 14.

In such case, limitation of the inrush current may be hard to achieve. In fact, the overall duration of the ramp-up phase may determine the magnitude of the average inrush current, and such average current value may be obtained as the average of the inrush current peaks during each switching cycle of the converter.

For instance, in case a short duration of the ramp-up phase is required and a low switching frequency of the converter is provided, the ramp-up phase may be completed in a few clock cycles of the converter. Therefore, a target value of the average inrush current may be obtained as a result of averaging over a few current peaks, whose amplitude may still be critical for the converter device.

As a further drawback, the RC filter block 20 should be oversized (i.e., characterized by a sufficiently long time constant) in order to take into account possible PVT variations as well as possible variations of the output capacitance $C_L$ and/or of the output voltage $V_{OUT}$, thereby providing a satisfactory limitation of the inrush current also in a "worst case" scenario.

Such oversizing of the RC filter block 20 may be hardly compatible with both timing and inrush current specifications, e.g., specifications about a maximum rise-time of the output signal $V_{OUT}$ and a maximum value of the inrush current. In fact, an RC filter block with a long time constant may result in unnecessary long ramp-up phases, e.g., in case the desired output voltage $V_{OUT}$ is rather low.

In order to provide improved solutions, different soft-start circuits may be designed.

Figure 3:
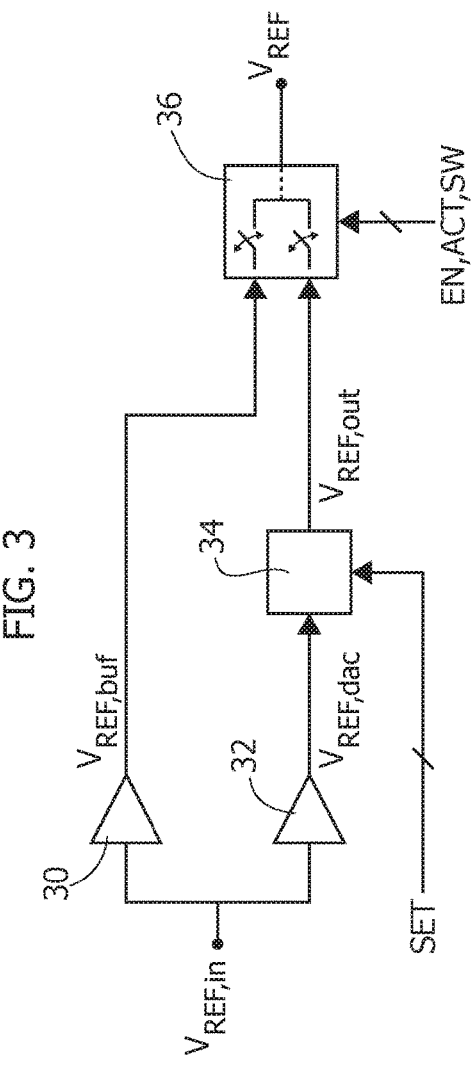
FIG. 3 is a diagram exemplary of a soft-start circuit in one or more embodiments.

For instance, FIG. 3 is a diagram exemplary of a soft-start circuit for converter devices in one or more embodiments.

Similarly to the circuit exemplified in FIG. 2, a reference signal $V_{REF}$ for the feedback loop of a converter device is provided at the output node of the soft-start circuit exemplified in FIG. 3.

In one or more embodiments as exemplified in FIG. 3, a (constant) input reference signal $V_{REF,in}$ is provided at an input node of the soft-start circuit.

The input reference signal $V_{REF,in}$ is buffered (with a variable gain $G_1$ possibly different from unity) by a first buffer 30 and a first buffered reference signal $V_{REF,buf}$ is provided at a first input of a switch circuit block 36, e.g., a multiplexer.

The input reference signal $V_{REF,in}$ is buffered (with a variable gain $G_2$ possibly different from unity, and possibly different from the gain $G_1$ of the first buffer 30) by a second buffer 32 and a second buffered reference signal $V_{REF,dac}$ is provided at a first input port of a Digital-to-Analog converter (DAC) 34, e.g., a 7-bit DAC.

In one or more embodiments, the Digital-to-Analog converter 34 receives at a second input port a digital signal SET, e.g., a 7-bit digital signal, provided by a digital circuit block (not shown in the figures).

The input digital signal SET may be converted by the DAC 34 into an output analog signal $V_{REF,out}$, with the value of the buffered reference signal $V_{REF,dac}$—which is a function of the input reference signal $V_{REF,in}$—being indicative of the full-scale range of the output analog signal $V_{REF,out}$.

For instance, in case the digital signal SET is a 7-bit signal, the input value "0000000" may be converted to the output value "0 V", the input value "1111111" may be converted to the output value "$V_{REF,dac}$", with the half-scale input value "1000000" being converted to the output value "$V_{REF,dac}/2$". Therefore, the conversion gain (or resolution) of the DAC 34 may be a function of the buffered reference signal $V_{REF,dac}$, and thus of the input reference signal $V_{REF,in}$.

In one or more embodiments, in case the digital signal SET is a N-bit signal, the resolution (i.e., the minimum possible change of the output analog signal $V_{REF,out}$ for any change of the input digital signal SET) of the DAC 34 may be equal to the value of the buffered reference signal $V_{REF,dac}$ divided by $2^N-1$.

The output signal $V_{REF,out}$ from the Digital-to-Analog converter 34 is provided at a second input of the switch circuit block 36. The switch circuit block 36 is controllable by control signals EN, ACT, SW in order to propagate to the output node $V_{REF}$ one of the signals $V_{REF,buf}$ and $V_{REF,out}$ at its first and second input ports, respectively.

Exemplary operation of control signals EN, ACT, SW is explained in the following.

For instance, signal EN may enable the whole soft-start circuit. Signal EN may be set to high in advance with respect to signals ACT and SW, e.g., in order to correctly activate the soft-start circuit before generating the ramp signals (biasing of the soft-start circuit).

Signals ACT and SW may be indicative of the state of the soft-start circuit during the ramp-up phase. For instance, signals ACT and SW may be set to high at the same time at the start of the ramp-up phase. Once completed the ramp-up phase, the signal SW may be set again to low, so that the values of signals ACT and SW may define the status of the circuit according to the following combinations:

ACT=0 and SW=0: ramp-up not yet started,
ACT=1 and SW=1: ramp-up ongoing,
ACT=1 and SW=0: ramp-up completed.

Therefore, in one or more embodiments as exemplified in FIG. 3, at the start-up of a converter device coupled at the output node $V_{REF}$ of a soft-start circuit and during the successive ramp-up phase, the control signals EN, ACT, SW may assume values which configure the switch circuit block 36 to propagate the signal $V_{REF,out}$ from the output of the Digital-to-Analog converter 34 to the output node $V_{REF}$.

For instance, control signals EN, ACT, SW may be set to high in order to propagate the signal $V_{REF,out}$ to the output node $V_{REF}$.

During the ramp-up phase of the converter device, the digital signal SET received at the second input port of the DAC 34 varies at a certain frequency, e.g., it may increase by one unit at each clock cycle. The frequency of the digital signal SET may be a function of the switching frequency of the converter. Therefore, the frequency of the digital signal SET may define the duration of the rise time of the signal $V_{REF,out}$ and thus of the reference signal $V_{REF}$ during the ramp-up phase, which may determine the duration of the ramp-up phase of the output signal $V_{OUT}$ of a converter device coupled thereto, with the possibility of slowing down the ramp-up phase with the aim of limiting the inrush current.

As a result of the signal $V_{REF,out}$ reaching a target value, e.g., the value $V_{REF,dac}$ as a consequence of the digital signal SET reaching a maximum value, the control signals EN, ACT, SW may assume values (e.g., EN=1 and ACT=1 and SW=0, according to the operation exemplified above) which configure the switch circuit block 36 to propagate the signal $V_{REF,buf}$ from the output of the first buffer 30 to the output node $V_{REF}$, thereby ending the ramp-up phase and providing a configuration of the switch circuit block 36 adapted for operation of the converter device at a stationary working point. Since the signal $V_{REF,buf}$ may assume a value—e.g., by setting the gain $G_1$ of the buffer 30 accordingly—equal to the target value reached by the signal $V_{REF,out}$ at the end of the ramp-up phase, such commutation may not involve any step (i.e., abrupt variation) of the output signal $V_{REF}$.

It is noted that, referring herein to rise-times and/or ramp-up phases is by way of example only. Similar operation of one or more embodiments may be involved in the case of decreasing values of the output voltage $V_{OUT}$, which would be described in terms of fall-times and ramp-down phases.

As noted, some applications, e.g., power supply of AMO-LED screen panels, may involve plural converters for providing plural supply voltage nodes $V_{OUT,1}$, $V_{OUT,2}$, $V_{OUT,3}$.

Figure 4:
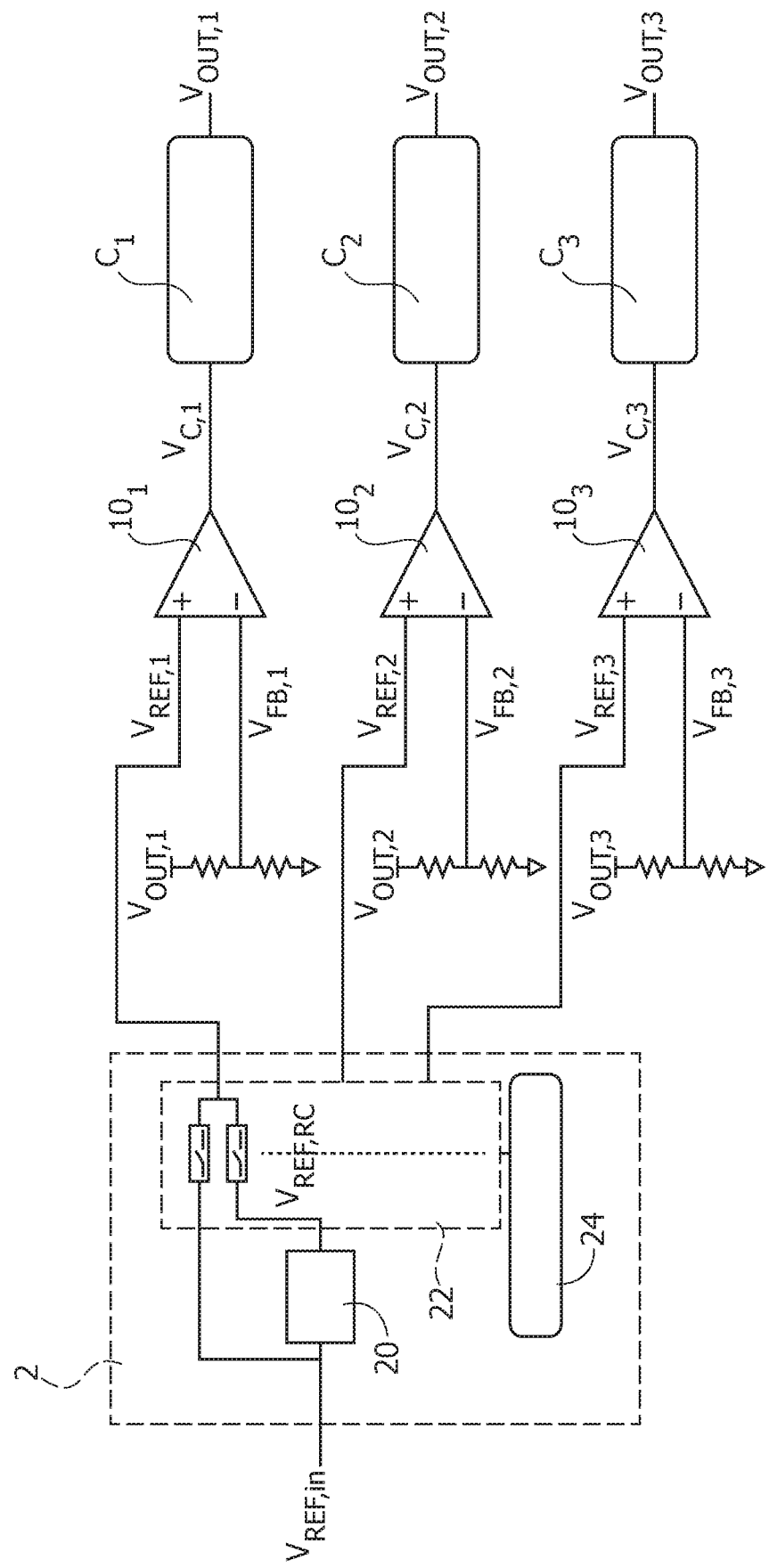
FIG. 4 is exemplary of a system comprising plural converters and a soft-start circuit architecture according to FIG. 2.

For instance, FIG. 4 is exemplary of a converter system comprising multiple converters $C_1$, $C_2$, $C_3$ (with each of the converters $C_1$, $C_2$, $C_3$ being similar, e.g., to a DC/DC converter C as exemplified in FIG. 1) and a soft-start circuit architecture 2 according to FIG. 2.

It will be noted that referring to three converters $C_1$, $C_2$, $C_3$ in the present description is by way of example only, and that one or more embodiments may be applied to any number of converters.

Each of the converters $C_i$ (e.g., i=1, 2, 3) may provide a regulated output voltage $V_{OUT,i}$ for supplying power to a certain supply node in an electronic device, with the values of the output voltages $V_{OUT,i}$ possibly being different one from the other.

Each of the converters $C_i$ may have a respective differential circuit $10_i$ for providing a respective control signal $V_{C,i}$. Each of the differential circuits $10_i$ may have a respective first input coupled to a respective output node from a soft-start circuit 2, and a respective second input coupled to an intermediate node of a respective voltage divider, providing a respective feedback signal $V_{FB,i}$.

In a converter system as exemplified in FIG. 4, the soft-start circuit 2 may be based on a circuit architecture according to the exemplary diagram of FIG. 2, with the difference of providing plural reference signals $V_{REF,i}$ for the respective converters $C_i$. Therefore, the multiplexer 21 of the architecture exemplified in FIG. 2 may be replaced by a switch circuit block 22 having plural output nodes $V_{REF,i}$ and being controllable by a logic circuit block 24 providing a plurality of control signals SW.

Some applications may involve plural converters switching on at different instants according to a certain start-up sequence, the plural converters being coupled to a same soft-start circuit. Such a start-up sequence of the converters $C_i$ may depend on the specific electronic device to which the converter system is coupled. For instance, at the start-up of the converter systems, the converters $C_i$ may switch on according to the sequence $C_3 \to C_1 \to C_2$. Other sequences are possible.

Therefore, according to such exemplary sequence, the switch circuit block 22 may be controlled by the logic circuit block 24 in order to firstly trigger the soft-start of converter $C_3$ by coupling the node $V_{REF,3}$ to the node $V_{REF,RC}$ according to an operation as exemplarily described with reference to FIG. 2. As a result of the output voltage $V_{OUT,3}$ reaching a stable value around the respective stationary working point, the node $V_{REF,3}$ may be decoupled from node $V_{REF,RC}$ and coupled to node $V_{REF,in}$. Then, similar operations may be performed for the converter $C_1$, and finally for the converter $C_2$, thereby achieving the soft-start of plural converters by relying on the same RC filter block 20 and on a single switch circuit block 22.

Once completed the start-up sequence of the converters, (all) nodes $V_{REF,i}$ can be steadily coupled to the node $V_{REF,in}$ via the switch circuit block 22.

A converter system as exemplified in FIG. 4 may have the drawbacks discussed with regard to the circuit architecture exemplified in FIG. 2.

Moreover, a further drawback of a converter system as exemplified in FIG. 4 may result from the fact that the same ramp-up duration is applied to different converters $C_i$ without providing the possibility of differentiating the ramp-up duration for different converters $C_i$. This is due to the fact that the ramp-up duration may depend on the (fixed) time constant of the RC filter block 20.

Figure 5:
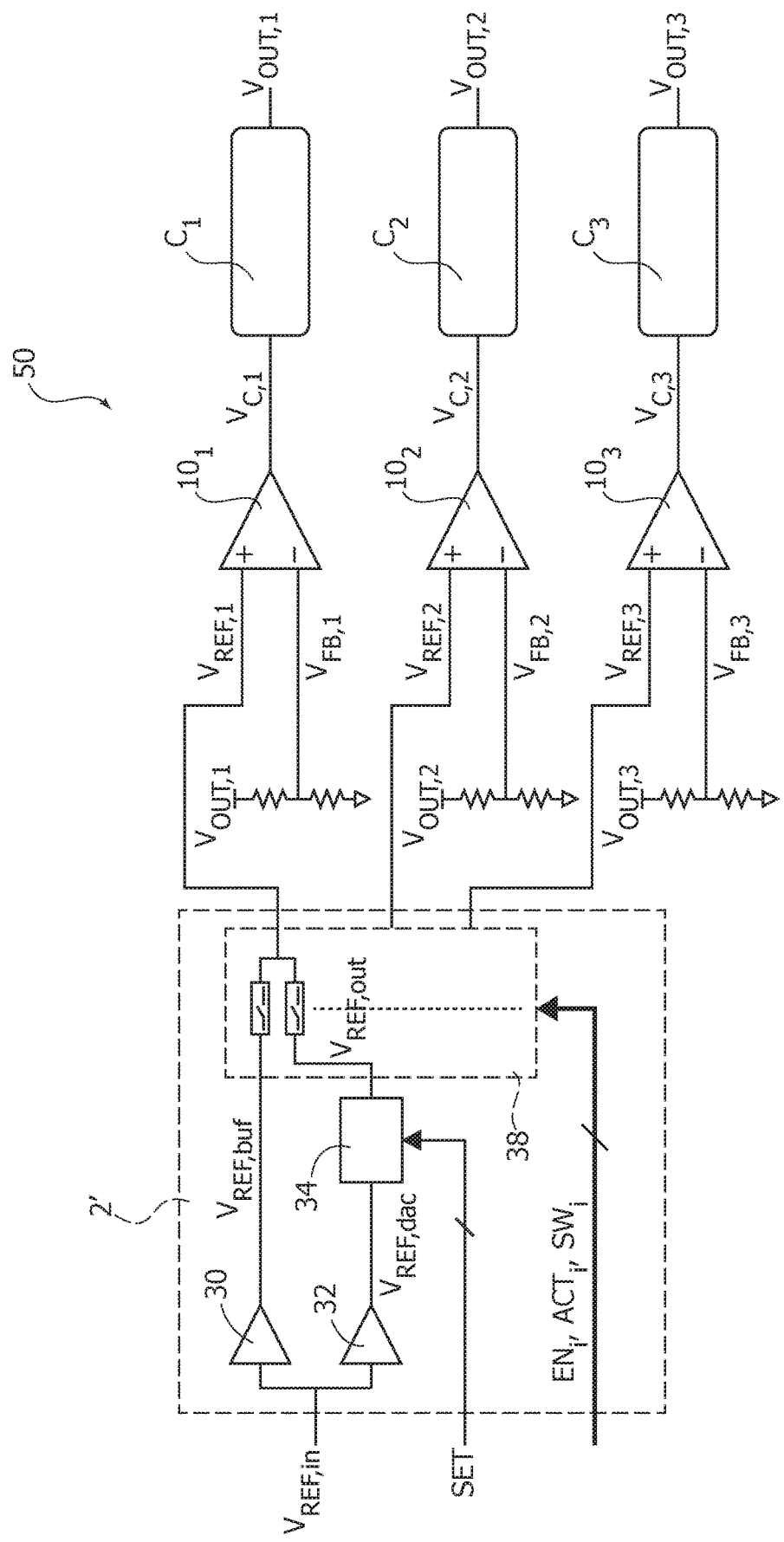
FIGS. 5 and 6 are diagrams exemplary of systems comprising plural converters in one or more embodiments.

Therefore, a soft-start circuit architecture as exemplified in FIG. 3 may be used in a converter system as exemplified in FIG. 5, in order to provide improved solutions.

Differently from FIG. 4, FIG. 5 is exemplary of a converter system in one or more embodiments, comprising plural converters $C_1$, $C_2$, $C_3$ and a soft-start circuit architecture 2' similar to the architecture exemplified in FIG. 3.

In the architecture exemplified in FIG. 5 the switch circuit block 36 of FIG. 3, receiving input control signals EN, ACT, SW and providing an output signal $V_{REF}$, is replaced by a switch circuit block 38 (or switch matrix) receiving plural input control signals $EN_i$, $ACT_i$, $SW_i$ and providing plural output signals $V_{REF,i}$ for the respective converters $C_i$.

The switch circuit block 38 may receive signals $EN_i$, $ACT_i$, $SW_i$ for performing the soft-start of converters $C_i$ in a certain sequence, e.g., again the exemplary sequence $C_3 \rightarrow C_1 \rightarrow C_2$, wherein the soft-start of each of converters $C_i$ may be obtained according to an operation as exemplarily described with reference to FIG. 3, relying on a single Digital-to-Analog converter 34.

Therefore, according to such exemplary sequence, the switch circuit block 38 may be controlled by signals $EN_i$, $ACT_i$, $SW_i$ in order to firstly trigger the soft-start of converter $C_3$ by coupling the node $V_{REF,3}$ to the node $V_{REF,out}$ according to an operation as exemplarily described with reference to FIG. 3. As a result of the output voltage $V_{OUT,3}$ reaching a stable value around the respective stationary working point, the node $V_{REF,3}$ may be decoupled from node $V_{REF,out}$ and coupled to node $V_{REF,buf}$. Then, similar operations may be performed for the converter $C_1$, and finally for the converter $C_2$, thereby achieving the soft-start of plural converters by relying on the same DAC 34 and on a single switch circuit block 38.

Once completed the start-up sequence of the converters, (all) nodes $V_{REF,i}$ are coupled to the node $V_{REF,buf}$ via the switch circuit block 38.

Figure 6:
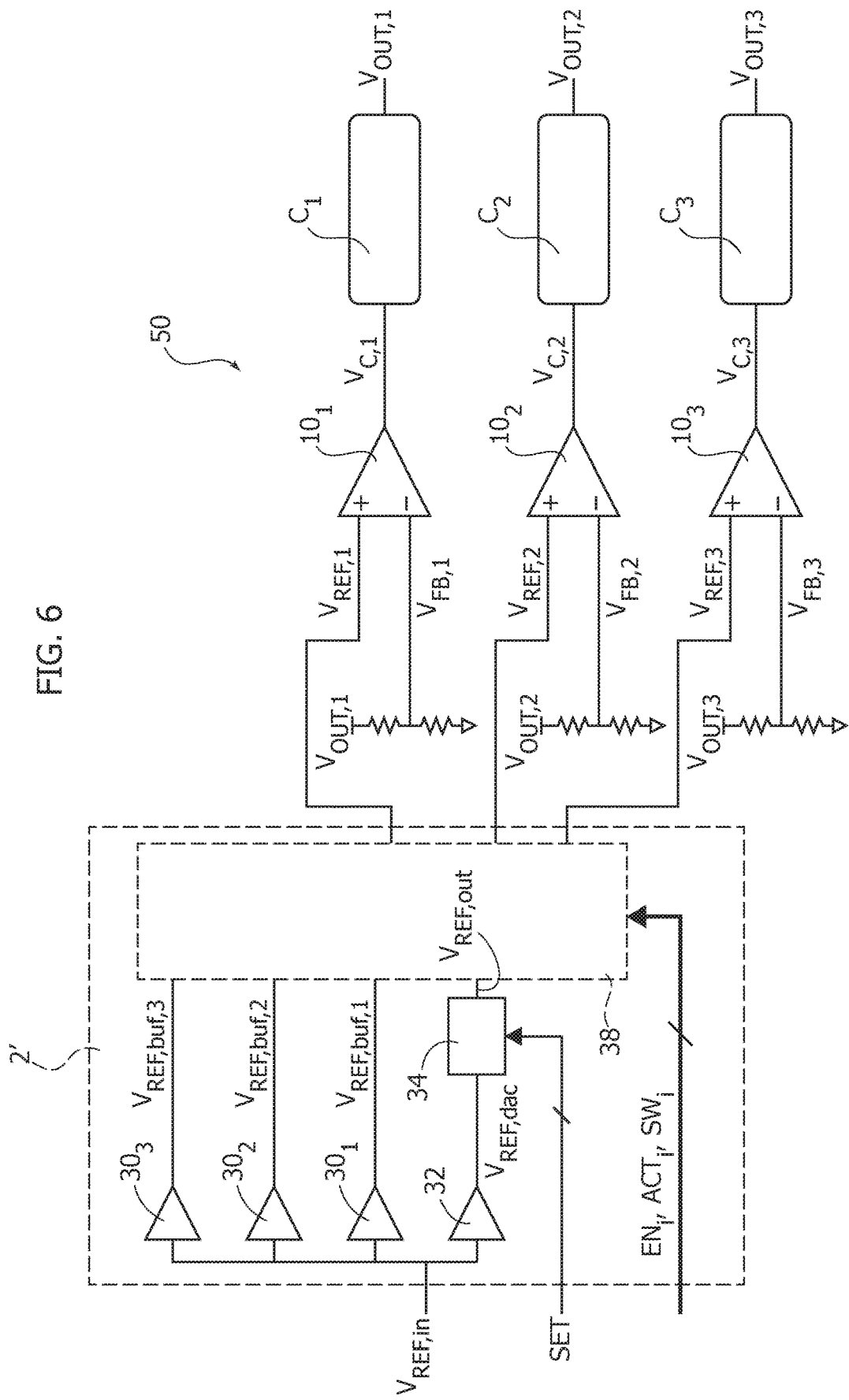

In one or more embodiments as exemplified in FIG. 6, a soft-start circuit 2' may have a plurality of first buffers $30_i$, for instance three first buffers $30_1$, $30_2$, $30_3$. The first buffers $30_1$, $30_2$, $30_3$ may have respective inputs coupled to the input node of the soft-start circuit 2' to receive the input reference signal $V_{REF,in}$. First buffers $30_1$, $30_2$, $30_3$ may provide respective first buffered reference signals $V_{REF,buf,1}$, $V_{REF,buf,2}$, $V_{REF,buf,3}$ to a switch circuit block 38, e.g., a multiplexer. The first buffers $30_1$, $30_2$, $30_3$ may have respective gains $G_{1,1}$, $G_{1,2}$, $G_{1,3}$ possibly different from each other, so that the values of the buffered reference signals $V_{REF,buf,1}$, $V_{REF,buf,2}$, $V_{REF,buf,3}$ may be different from each other.

It will be noted that the number of first buffers 30 in one or more embodiments may be adapted to match the number of output signals $V_{REF,i}$ provided by the switch circuit block 38. By doing so, at the end of the ramp-up phase of a converter $C_i$, the respective node $V_{REF,i}$ may be coupled to a respective signal $V_{REF,buf,i}$ through the switch circuit block 38.

Therefore, in one or more embodiments, at the end of the start-up sequence of the converters $C_i$, each node $V_{REF,i}$ may be coupled to a respective signal $V_{REF,buf,i}$ whose value is adapted to the stationary working point of the respective converter $C_i$.

It is noted that, despite exemplary embodiments are described herein which have three converters $C_i$, other embodiments may have a different number of converters $C_i$, the architecture of the soft-start circuit 2' being adapted consequently.

Therefore, in one or more embodiments as exemplified in FIG. 6, a plurality of converters $C_i$ may be soft-started in a certain sequence by means of a soft-start circuit 2' having a single DAC 34. The DAC 34 provides the possibility of changing the parameters of the ramp-up phase of each of the converters, e.g., by setting the frequency and/or the initial and final values of the digital signal SET which is converted into the analog signal $V_{REF,out}$. The plurality of first buffers $30_1$, $30_2$, $30_3$ provide the possibility of setting different values of the reference signals $V_{REF,i}$ for different converters, which may be adapted to different stationary working points.

In one or more embodiments, the number of first buffers $30_i$ may be lower than the number of converters $C_i$, e.g., in case two or more converters $C_i$ rely on input reference signals $V_{REF,i}$ having the same value and thus being provided by a same buffer $30_i$.

One or more embodiments relying on the use of a DAC 34 may provide several advantages over approaches relying on the use of a RC filter block 20.

For instance, in one or more embodiments, different ramp-up durations may be obtained for different converters $C_i$ with a single DAC 34, as a result of the ramp-up duration being dependent on the frequency of the digital signal SET received at the DAC 34. A digital circuit block (not shown in the figures) may provide a digital signal SET with variable clock frequency, wherein such clock frequency is varied during the start-up sequence of the converters $C_i$, e.g., $C_3 \rightarrow C_1 \rightarrow C_2$, in order determine different ramp-up durations for different converters $C_i$.

One or more embodiments may provide a possibility to set start values and final values of the signal $V_{REF,out}$—and thus, of the signals $V_{REF,i}$ coupled thereto—which are different from the full-scale minimum and maximum values of the input reference signal $V_{REF,in}$, e.g., respectively 0 V and $V_{REF,in}$.

For instance, the signal $V_{REF,1}$ may increase from the value $V_{REF,in}/3$ to the value $V_{REF,in}/2$ during the ramp-up phase by making the digital signal SET increase from ⅓ of its full-scale value (e.g., "0101010" in case the signal SET is encoded with 7 bits) to ½ of its full-scale value (e.g., "1000000" in case the signal SET is encoded with 7 bits), with the possibility for different reference signals $V_{REF,i}$ to span respective different voltage ranges.

In such cases, the gain $G_{1,i}$ of a first buffer $30_i$ may be set in order to generate a signal $V_{REF,buf,i}$ equal to the final ("target") value of the signal $V_{REF,out}$ at the end of the ramp-up phase of the converter $C_i$, thereby reducing the occurrence of possible "jumps" of the signals $V_{REF,i}$ which would result in uncontrolled inrush currents.

This possibility may be advantageous in generating start-up ramps of the reference signals $V_{REF,i}$ which span a voltage range that is adapted for the application of the respective converter $C_i$, possibly reducing the respective ramp-up duration without resulting in an increase of the inrush current above certain safety limits, or otherwise possibly reducing the respective magnitude of the inrush current without resulting in a longer ramp-up phase. Thus, one or more embodiments may facilitate improving the trade-off between ramp-up duration and inrush current magnitude of converters and converter systems.

As described above, one or more embodiments may facilitate reducing area occupation of a soft-start circuit 2' for plural DC/DC converters $C_i$ by providing a single Digital-to-Analog converter 34 for generating plural ramped reference signals $V_{REF,i}$, the DAC 34 being selectively couplable to any of the converters $C_i$.

One or more embodiments may provide a soft-start circuit 2' with reduced power consumption, by decoupling the output node of the DAC 34 from the input nodes $V_{REF,i}$ as a result of the respective ramp-up phases being completed, and allowing for switching off the whole DAC circuit once completed the start-up of (all) the converters required by the application in the set of converters couplable to the soft-start circuit 2' (i.e., once reached the desired stationary working points).

One or more embodiments may reduce additional mismatch contributions possibly introduced by the Digital-to-Analog converter 34 by decoupling the output node of the DAC 34 from the input nodes $V_{REF,i}$ and switching off the whole DAC circuit once reached the desired stationary working points.

For instance, the DAC 34 may introduce some offset and gain errors at its output. Such errors may not influence operation of the converter devices $C_i$ during stationary operation, since the DAC may be totally decoupled from their input nodes once completed the ramp-up phase.

In one or more embodiments, the reference signals $V_{REF,i}$ may span a voltage range whose initial and final values may be configured "on the fly" by making the digital signal SET vary accordingly in a configurable range of the respective full-scale value, thus facilitating controlling and improving the ramp-up duration and/or the magnitude of the inrush current.

In one or more embodiments, duration of the ramp-up phase of signals $V_{REF,i}$ may be configurable by providing a variable-frequency digital signal SET, wherein the frequency of the digital signal SET may be related to the switching frequency of a converter $C_i$ (i.e., the frequency of the respective PWM signal controlling the respective power switch 14) to facilitate reducing the impact of clock mismatches. For instance, the frequency of the digital signal SET being related to the switching frequency of a converter $C_i$ may result in a respective ramp-up phase which lasts for a determined number of clock cycles, with such number of clock cycles being not dependent on possible variations of the clock frequency, thus resulting in an improved control of the inrush current peaks.

In one or more embodiments, different durations of the ramp-up phases of different signals $V_{REF,i}$ may be obtained by providing a variable-frequency digital signal SET, and different initial and final values of the voltage ranges of different signals $V_{REF,i}$ may be obtained by providing a configurable range for the digital signal SET.

A circuit (e.g., 2') according to one or more embodiments may comprise an input node configured to receive an input reference signal (e.g., $V_{REF,in}$) and at least one output node configured to provide a respective replica ($V_{REF}$; $V_{REF,1}$, $V_{REF,2}$, $V_{REF,3}$) of the input reference signal with a respective scaling ratio to the input reference signal at the input node. A digital-to-analog converter (e.g., 34) has a reference input configured (e.g., 32, $V_{REF,dac}$) to receive the input reference signal from the input node, a digital input configured to receive a digital input signal (e.g., SET) having a digital signal value, and a digital-to-analog converter output configured to provide an output signal (e.g., $V_{REF,out}$) from the digital-to-analog converter resulting from conversion to analog of the digital input signal. The at least one output node of the circuit is configured (e.g., 36, 38) to sense the output signal from the digital-to-analog converter and to provide at the at least one output node the respective replica of the input reference signal. The respective scaling ratio of the respective replica to the input reference signal is a function of the value of the digital input signal.

In one or more embodiments, the digital input signal may be a variable-frequency digital signal.

One or more embodiments may comprise a switch circuit block (e.g., 36; 38) configured to couple (e.g., EN, ACT, SW; $EN_i$, $ACT_i$, $SW_i$) the at least one output node to one of a respective first signal path (e.g., $30_1$, $V_{REF,buf,1}$, $30_2$, $V_{REF,buf,2}$, $30_3$, $V_{REF,buf,3}$) from the input node, or a second signal path (e.g., 32, $V_{REF,dac}$, 34, $V_{REF,out}$) from the output of the digital-to-analog converter.

One or more embodiments may comprise a plurality of output nodes and a switch circuit block (e.g., 38) configured to couple the input node to selected ones of the output nodes in the plurality of output nodes to provide thereto respective replicas of the input reference signal with respective scaling ratios to the input reference signal at the input node.

In one or more embodiments, the switch circuit block may be configured to couple the input node to selected ones of the output nodes in the plurality of output nodes via one of the respective first signal path from the input node, or the second signal path from the output of the digital-to-analog converter.

A device according to one or more embodiments may comprise a circuit (e.g., 2') according to one or more embodiments. At least one converter circuit (e.g., $C_1$, $C_2$, $C_3$) has a converter input node (e.g., $V_{C,1}$, $V_{C,2}$, $V_{C,3}$) coupled (e.g., $10_1$, $10_2$, $10_3$) to the at least one output node of the circuit.

A device according to one or more embodiments may comprise. A circuit (2') according to one or more embodiments. The converter circuits in a plurality of converter circuits have respective converter input nodes coupled to respective ones of the output nodes in the plurality of output nodes of the circuit.

A method of operating a circuit according to one or more embodiments may comprise applying an input reference signal to the input node of the circuit, applying a digital input signal having a digital signal value to the digital input of the digital-to-analog converter in the circuit, the digital input signal preferably including a ramp signal, and sensing (e.g., 38) the output signal (e.g., $V_{REF,out}$) from the digital-to-analog converter. A respective replica of the input reference signal is provided at the at least one output node and the respective scaling ratio of the respective replica to the input reference signal is a function of the value of the digital input signal.

A method according to one or more embodiments may comprise varying over time the digital signal value of the digital input signal applied to the digital input of the digital-to-analog converter.

A method according to one or more embodiments may comprise varying the digital signal value of the digital input signal applied to the digital input of the digital-to-analog converter over digital signal variation intervals, the method comprising varying the duration of the digital signal variation intervals, and/or varying the beginning and/or end of the digital signal variation intervals.

A method according to one or more embodiments may comprise providing a plurality of digital signal variation laws indicative of a plurality of respective behaviors over time of the digital signal value of the digital input signal applied to the digital input of the digital-to-analog converter;

and varying the digital signal value of the digital input signal applied to the digital input of the digital-to-analog converter according to a variation law selected out of the plurality of variation laws.

A method according to one or more embodiments may comprise coupling the at least one output node of the circuit to one of a respective first signal path from the input node of the circuit, or a second signal path from the output of the digital-to-analog converter in the circuit.

A method according to one or more embodiments may comprise providing a plurality of output nodes for the circuit and coupling the input node of the circuit to selected ones of the output nodes in the plurality of output nodes to provide thereto respective replicas of the input reference signal with respective scaling ratios to the input reference signal at the input node.

A method according to one or more embodiments may comprise coupling the input node of the circuit to selected ones of the output nodes in the plurality of output nodes of the circuit via one of the respective first signal path from the input node, or the second signal path from the output of the digital-to-analog converter.

A method according to one or more embodiments may comprise coupling the input node of the circuit to a first output node in the plurality of output nodes of the circuit via the second signal path from the output of the digital-to-analog converter and varying the digital signal value of the digital input signal applied to the digital input of the digital-to-analog converter until the respective first scaling ratio of the respective first replica (e.g., $V_{REF,1}$) at the first output node in the plurality of output nodes to the input reference signal reaches a respective first threshold value. As a result of the respective first scaling ratio of the respective first replica at the first output node in the plurality of output nodes to the input reference signal reaching the respective first threshold value, the input node can be coupled to the first output node in the plurality of output nodes via the respective first signal path. The input node can be coupled to at least one second output node in the plurality of output nodes via the second signal path from the output of the digital-to-analog converter. The digital signal value of the digital input signal applied to the digital input of the digital-to-analog converter is varied until the respective second scaling ratio of the respective second replica (e.g., $V_{REF,2}$) at the at least one second output node in the plurality of output nodes to the input reference signal reaches a respective second threshold value.

A method according to one or more embodiments may comprise, as a result of the respective second scaling ratio of the respective second replica at the at least one second output node in the plurality of output nodes reaching the respective second threshold value, coupling the input node to the at least one second output node in the plurality of output nodes via the respective first signal path. The input node is coupled to at least one third output node in the plurality of output nodes via the second signal path from the output of the digital-to-analog converter. The digital signal value of the digital input signal applied to the digital input of the digital-to-analog converter is varied until the respective third scaling ratio of the respective third replica (e.g., $V_{REF,3}$) at the at least one third output node in the plurality of output nodes to the input reference signal reaches a respective third threshold value.

A method according to one or more embodiments may comprise varying the frequency of the digital input signal as a function of which of the output nodes in the plurality of output nodes is coupled to the input node.

Without prejudice to the underlying principles, the details and embodiments may vary, even significantly, with respect to what has been described by way of example only, without departing from the extent of protection.

The extent of protection is defined by the annexed claims.

What is claimed is:

1. A method of operating a circuit, the method comprising:
   receiving an input reference signal at an input node;
   determining a scaling ratio based on the input reference signal;
   generating a digital input signal as a function of the determined scaling ratio;
   converting the digital input signal into an analog signal that is a scaled replica of the input reference signal; and
   providing the analog signal at an output node of the circuit and then, after a duration of time, coupling the input reference signal to the output node.

2. The method of claim 1, further comprising buffering the input reference signal, wherein coupling the input reference signal to the output node comprises coupling the buffered input reference signal to the output node.

3. The method of claim 2, wherein buffering the input reference signal comprises buffering the input reference signal with a non-unity gain.

4. The method of claim 2, further comprising performing a second buffering of the input reference signal, wherein the analog signal that is a scaled replica of the second buffered input reference signal.

5. The method of claim 4, wherein buffering the input reference signal comprises buffering the input reference signal with a first gain and wherein performing the second buffering of the input reference signal comprises buffering with a second gain that is different than the first gain.

6. The method of claim 1, wherein the circuit includes a plurality of output nodes, the method comprising generating a plurality of digital input signals as a function of respective scaling ratios, converting each digital input signal into respective analog signal that is a scaled replica of the input reference signal based on the respective scaling ratio, and providing each analog signal at a respective output node of the circuit.

7. A method of operating a circuit, the method comprising:
   receiving an input reference signal at an input node;
   generating a digital input signal that varies over a period of time;
   converting the digital input signal into an analog signal that is a scaled replica of the input reference signal, a scaling ratio of the scaled replica being increased in magnitude over time;
   providing the analog signal at an output node of the circuit; and
   when the scaled ratio reaches a threshold, switching the output so that the input reference signal is provided at the output node.

8. The method of claim 7, wherein generating the digital input signal comprises increasing the value of the digital input signal over time.

9. The method of claim 7, wherein generating the digital input signal comprises varying the value of the digital input signal over time in constant digital signal variation intervals.

10. The method of claim 7, wherein generating the digital input signal comprises varying a duration that the digital input signal remains at a certain value.

11. The method of claim 7, wherein generating the digital input signal comprises varying a beginning or an end of digital signal variation intervals.

12. The method of claim 7, wherein generating the digital input signal comprises generating the digital input signal as a function of a desired magnitude of inrush current at the output node.

13. The method of claim 7, wherein the threshold is equal to a voltage value of the input reference signal.

14. The method of claim 13, wherein the analog signal has an initial voltage value of zero and a final voltage value that is equal to the voltage value of the input reference signal.

15. A circuit comprising:
- a reference signal input node configured to receive an input reference signal;
- a first buffer having an input coupled to the reference signal input node;
- a second buffer having an input coupled to the reference signal input node;
- a digital-to-analog converter having an reference input coupled to an output of the second buffer and a digital input coupled to a digital signal input node; and
- a multiplexer switch having a first input coupled to an output of the first buffer and a second input coupled to an output of the digital-to-analog converter, the multiplexer switch also having a control input and a reference signal output.

16. The circuit of claim 15, wherein the output of the digital-to-analog converter is configured to provide an output signal that is a replica of the input reference signal, wherein a scaling ratio of the replica to the input reference signal is a function of a digital input signal provided at the digital input of the digital-to-analog converter.

17. The circuit of claim 15, wherein the digital-to-analog converter is configured to convert a digital input signal provided at the digital input into an analog signal that is a scaled replica of the input reference signal, a scaling ratio of the scaled replica being increased in magnitude over time.

18. The circuit of claim 17, wherein the multiplexer switch includes a plurality of control inputs configured to control the multiplexer switch in a first mode where a ramp-up of the scaling ratio has not yet started, a second mode where the ramp-up of the scaling ratio is ongoing, and a third mode where the ramp-up of the scaling ratio is complete, wherein the multiplexer switch is configured to couple the second input of the multiplexer switch to the reference signal output in the first and second modes and to couple the first input of the multiplexer switch to the reference signal output after the ramp-up of the scaling ratio is complete.

19. The circuit of claim 15, wherein the multiplexer switch comprises a plurality of output nodes.

20. The circuit of claim 15, further comprising a converter circuit having a converter input node coupled to the reference signal output.

21. The circuit of claim 20, wherein the converter circuit comprises a DC-to-DC converter.

* * * * *